(12) United States Patent
Nishikawa

(10) Patent No.: US 9,083,431 B2
(45) Date of Patent: Jul. 14, 2015

(54) COMMUNICATION APPARATUS AND COMMUNICATION METHOD

(75) Inventor: Nobuyoshi Nishikawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 414 days.

(21) Appl. No.: 13/599,641

(22) Filed: Aug. 30, 2012

(65) Prior Publication Data

US 2013/0195098 A1 Aug. 1, 2013

(30) Foreign Application Priority Data

Jan. 26, 2012 (JP) ................................. 2012-013960

(51) Int. Cl.
*H04B 7/208* (2006.01)
*H04L 27/26* (2006.01)
*H04L 5/00* (2006.01)
*H04B 1/04* (2006.01)
*H04B 7/06* (2006.01)

(52) U.S. Cl.
CPC ............ *H04B 7/208* (2013.01); *H04L 27/2624* (2013.01)

(58) Field of Classification Search
CPC ............ H04L 27/2614; H04L 27/2623; H04L 27/2624; H04B 7/208
USPC ......... 370/203, 204, 206, 208, 210, 344, 480; 375/260, 267, 295, 297–299, 316, 340, 375/347; 455/101–103, 132, 500
See application file for complete search history.

(56) References Cited

U.S. PATENT DOCUMENTS

| | | | | |
|---|---|---|---|---|
| 7,627,046 | B1 * | 12/2009 | Dick et al. ..................... | 375/260 |
| 2007/0188218 | A1 * | 8/2007 | Ueda ............................. | 327/551 |
| 2008/0260055 | A1 * | 10/2008 | Kim et al. ..................... | 375/260 |
| 2011/0009153 | A1 * | 1/2011 | Chiba et al. .................. | 455/522 |

FOREIGN PATENT DOCUMENTS

JP 2006-165781 6/2006

\* cited by examiner

*Primary Examiner* — Un C Cho
*Assistant Examiner* — Peian Lou
(74) *Attorney, Agent, or Firm* — Warner Norcross & Judd LLP

(57) ABSTRACT

A modulator generates a modulation signal from an input signal. A serial-parallel converter generates a subcarrier modulation signal from the modulation signal. An IFFT unit performs an inverse fast Fourier transformation on the subcarrier modulation signal, generating first data. A decomposer decomposes the first data into real data and imaginary data. An operator performs a predetermined operation using a predetermined threshold value, a boundary value and the real data, generating positive data and negative data. Another operator performs a similar operation on the imaginary data. A generator adds the positive data and negative data based on the real data, and adds the positive data and negative data based on the imaginary data, generating real operation data and imaginary operation data. A synthesizer synthesizes both operation data to generate a baseband signal. A transmitter generates a transmission signal from the baseband signal, and transmits it to another apparatus via an antenna.

10 Claims, 6 Drawing Sheets

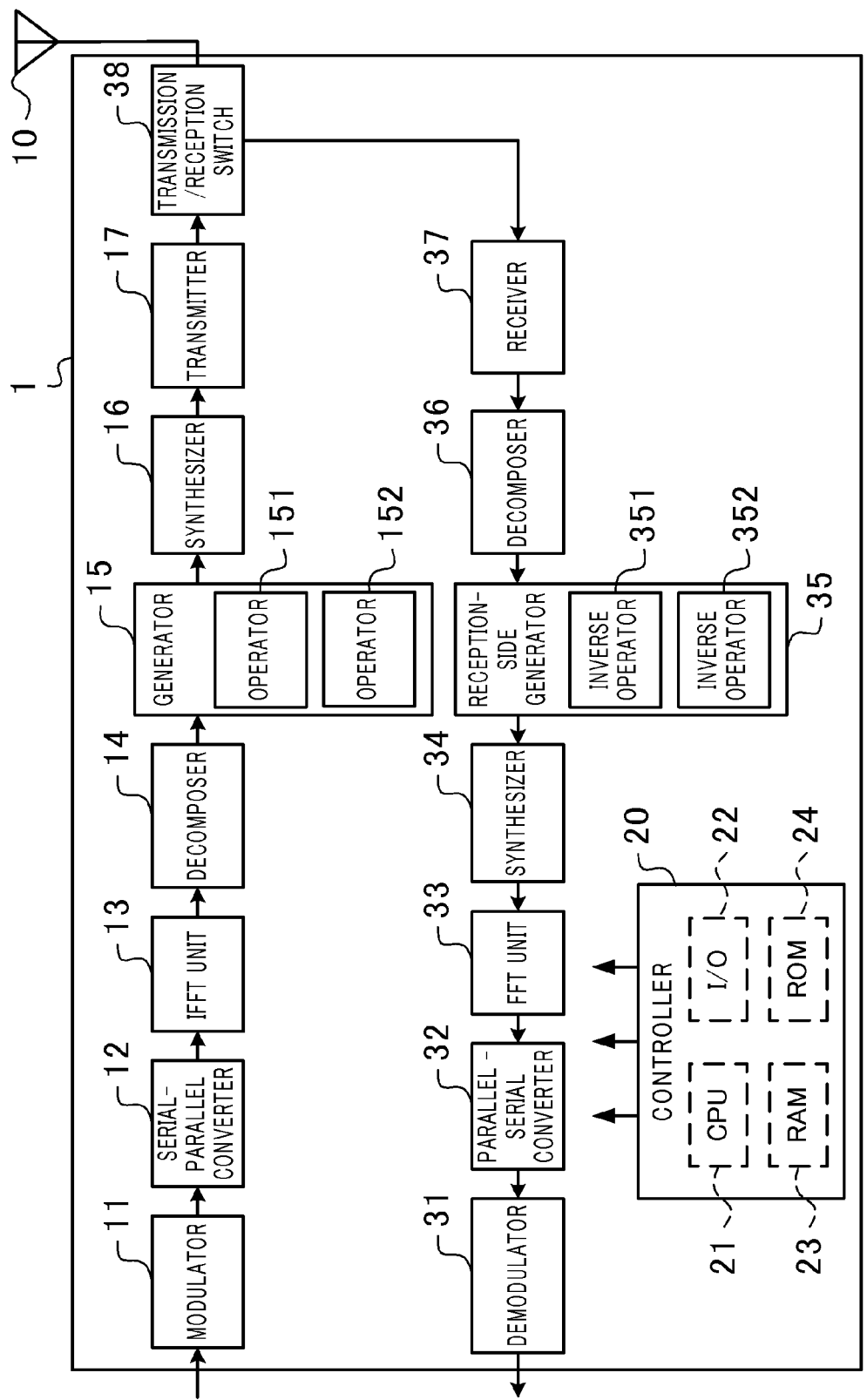

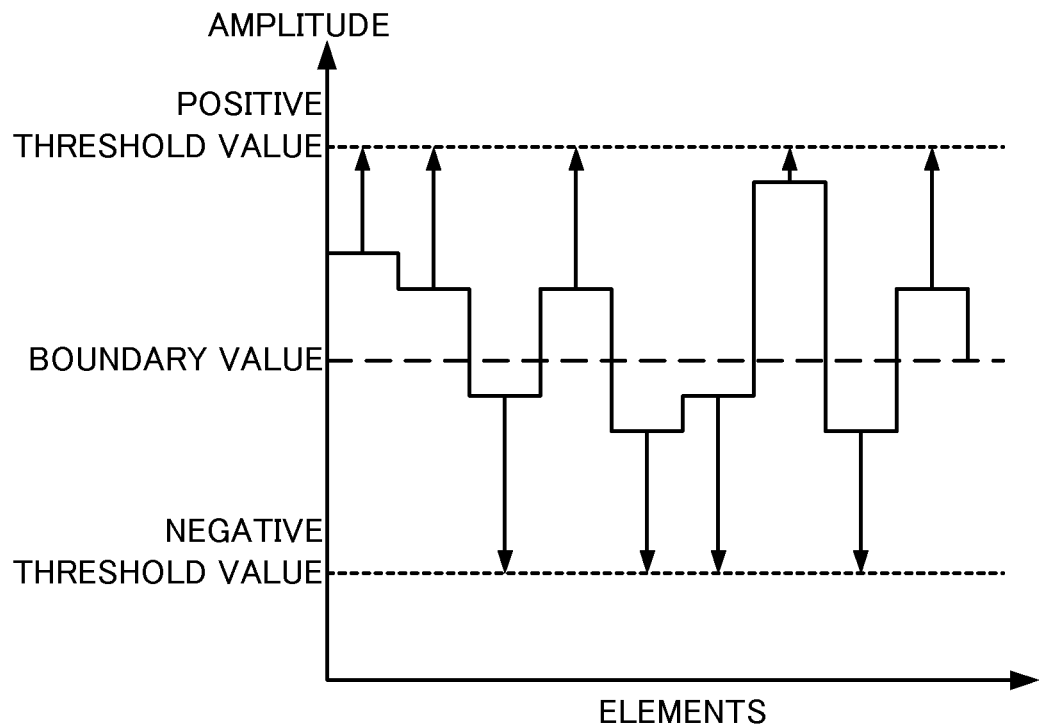
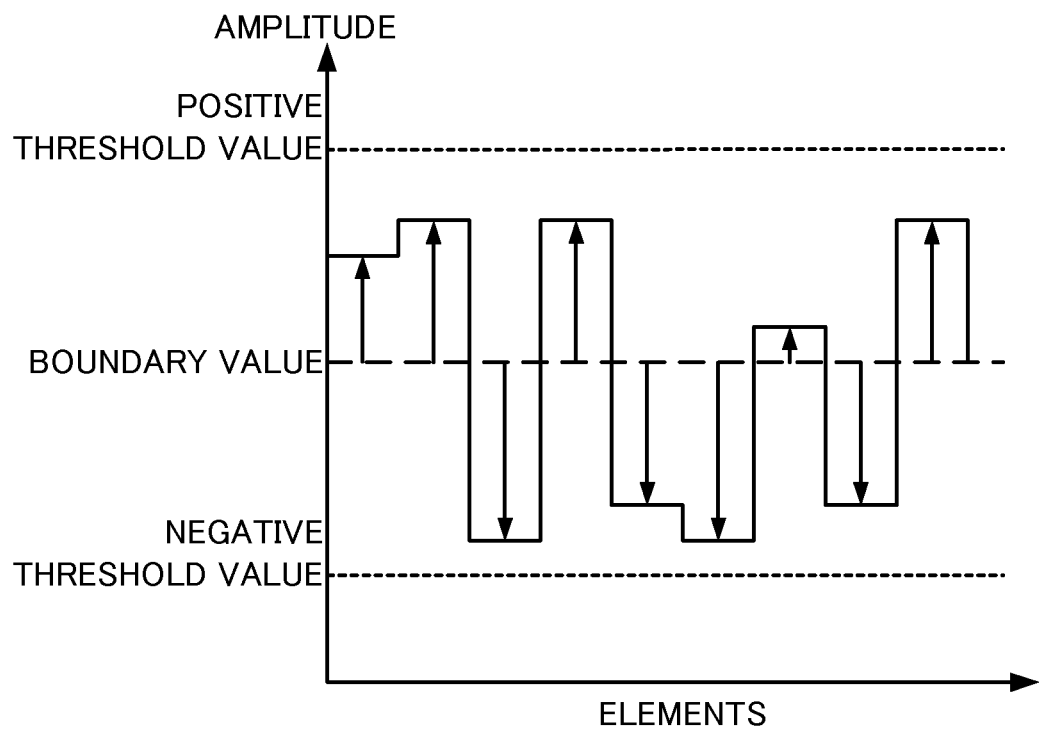

COMMUNICATION APPARATUS AND COMMUNICATION METHOD

CROSS REFERENCES TO RELATED APPLICATION

This application claims the benefit of Japanese Patent Application No. 2012-013960 filed on Jan. 26, 2012, the entire disclosure of which is incorporated by reference herein.

FIELD

This application relates to a communication apparatus and a communication method.

BACKGROUND

In OFDM (Orthogonal Frequency-Division Multiplexing) communication, an input signal is modulated with subcarriers, and the modulated input signal is subjected to an IFFT (Inverse Fast Fourier Transformation) to generate a baseband signal. When the number of subcarriers increases to increase the FFT (Fast Fourier Transformation) size, therefore, a baseband signal with a high peak is generated, increasing the PAPR (Peak-to-Average Power Ratio). The increase in the PAPR needs an amplifier having a wide range of linearity to transfer a signal without distortion. To meet the requirement, techniques of reducing the PAPR are developed.

Unexamined Japanese Patent Application KOKAI Publication No. 2006-165781 discloses a technique of controlling the phase of a subcarrier modulation signal based on the optimal phase, calculated by a sequential decision procedure, prior to an IFFT in order to reduce the PAPR.

The OFDM communication needs to cope with reducing the PAPR. The technique disclosed in Unexamined Japanese Patent Application KOKAI Publication No. 2006-165781 needs to control the phase, subcarrier by subcarrier, by repeatedly calculating the optimal phase to reduce the PAPR. In addition, the technique disclosed in Unexamined Japanese Patent Application KOKAI Publication No. 2006-165781 cannot control the degree of reduction in PAPR.

SUMMARY

Accordingly, it is an object of the present invention to reduce the PAPR in OFDM communication, and control the degree of reduction in PAPR.

To achieve the object, according to a first aspect of the invention, there is provided a communication apparatus for communicating with another apparatus in orthogonal frequency-division multiplexing wireless communication, the communication apparatus comprising:

a modulator that modulates an input signal using a predetermined modulation scheme, and assigns the modulated input signal to subcarriers with frequency components orthogonal to each other, thereby generating a subcarrier modulation signal;

a first transformer that performs an inverse fast Fourier transformation on the subcarrier modulation signal to generate first data;

a decomposer that decomposes the first data into real data which is a real part of the first data, and imaginary data which is an imaginary part of the first data;

an operator that, using a predetermined positive threshold value greater than a maximum value of elements in an input data series which is the real data or the imaginary data, and a predetermined negative threshold value equal to or less than a minimum value of the elements in the input data series, or using a predetermined positive threshold value equal to or greater than the maximum value of the elements in the input data series, and a predetermined negative threshold value less than the minimum value of the elements in the input data series, generates positive data by subtracting from the positive threshold value a value of each element whose value is greater than a predetermined boundary value and by setting to 0 a value of each element whose value is equal to or less than the predetermined boundary value in the elements of the input data series, and negative data by subtracting from the negative threshold value a value of each element whose value is equal to or less than the predetermined boundary value and by setting to 0 a value of each element whose value is greater than the predetermined boundary value in the elements of the input data series, or generates positive data by subtracting from the positive threshold value a value of each element whose value is equal to or greater than the predetermined boundary value and by setting to 0 a value of each element whose value is less than the predetermined boundary value in the elements of the input data series, and negative data by subtracting from the negative threshold value a value of each element whose value is less than the predetermined boundary value and by setting to 0 a value of each element whose value is equal to or greater than the predetermined boundary value in the elements of the input data series;

a generator that performs processing of the operator with each of the real data and the imaginary data being the input data series, adds the positive data and the negative data which are generated based on the real data to generate real operation data, and adds the positive data and the negative data which are generated based on the imaginary data to generate imaginary operation data;

a synthesizer that synthesizes the real operation data and the imaginary operation data to generate a baseband signal; and a transmitter that generates a transmission signal from the baseband signal.

It is preferable that the predetermined boundary value may be less than the maximum value of the elements of the input data series, and greater than the minimum value of the elements of the input data series.

It is preferable that the predetermined boundary value may be 0.

It is preferable that the operator may use the same positive threshold value and the same negative threshold value in cases where the input data series is the real data and where the input data series is the imaginary data.

According to a second aspect of the invention, there is provided a communication apparatus for communicating with another apparatus in orthogonal frequency-division multiplexing wireless communication, the communication apparatus comprising:

a receiver that receives a transmission signal and generates a baseband signal;

a serial-parallel converter that performs serial-parallel conversion on the baseband signal to generate a parallel signal;

a reception-side decomposer that decomposes the parallel signal into real data which is a real part of the parallel signal, and imaginary data which is an imaginary part of the parallel signal;

an inverse operator that generates positive data by subtracting from a predetermined positive threshold value a value of each element whose value is greater than 0 and by setting to 0 a value of each element whose value is equal to or less than 0 in elements of an input data series which is the real data or the imaginary data, and negative data by subtracting from a predetermined negative threshold value a value of each element whose value is equal to or less than 0 and by setting to 0 a value of each element whose value is greater than 0 in the elements of the input data series, or generates positive data by subtracting from the positive threshold value a value of each element whose value is equal to or greater than 0 and by setting to 0 a value of each element whose value is less than 0 in the elements of the input data series, and negative data by subtracting from the negative threshold value a value of each element whose value is less than 0 and by setting to 0 a value of each element whose value is equal to or greater than 0 in the elements of the input data series;

a reception-side generator that performs processing of the inverse operator with each of the real data and the imaginary data being the input data series, adds the positive data and the negative data which are generated based on the real data to generate real inverse operation data, and adds the positive data and the negative data which are generated based on the imaginary data to generate imaginary inverse operation data;

a reception-side synthesizer that synthesizes the real inverse operation data and the imaginary inverse operation data to generate second data;

a second transformer that performs a fast Fourier transformation on the second data to generate a subcarrier modulation signal; and a demodulator that demodulates the subcarrier modulation signal by a predetermined demodulation scheme.

According to a third aspect of the invention, there is provided a communication method that is executed by a communication apparatus communicating with another apparatus in orthogonal frequency-division multiplexing wireless communication, the communication apparatus method comprising:

a modulation step of modulating an input signal using a predetermined modulation scheme, and assigning the modulated input signal to subcarriers with frequency components orthogonal to each other, thereby generating a subcarrier modulation signal;

a first transformation step of performing an inverse fast Fourier transformation on the subcarrier modulation signal to generate first data;

a decomposition step of decomposing the first data into real data which is a real part of the first data, and imaginary data which is an imaginary part of the first data;

an operation step of, using a predetermined positive threshold value greater than a maximum value of elements in an input data series which is the real data or the imaginary data, and a predetermined negative threshold value equal to or less than a minimum value of the elements in the input data series, or using a predetermined positive threshold value equal to or greater than the maximum value of the elements in the input data series, and a predetermined negative threshold value less than the minimum value of the elements in the input data series, generating positive data by subtracting from the positive threshold value a value of each element whose value is greater than a predetermined boundary value and by setting to 0 a value of each element whose value is equal to or less than the predetermined boundary value in the elements of the input data series, and negative data by subtracting from the negative threshold value a value of each element whose value is equal to or less than the predetermined boundary value and by setting to 0 a value of each element whose value is greater than the predetermined boundary value in the elements of the input data series, or generating positive data by subtracting from the positive threshold value a value of each element whose value is equal to or greater than the predetermined boundary value and by setting to 0 a value of each element whose value is less than the predetermined boundary value in the elements of the input data series, and negative data by subtracting from the negative threshold value a value of each element whose value is less than the predetermined boundary value and by setting to 0 a value of each element whose value is equal to or greater than the predetermined boundary value in the elements of the input data series;

a generation step of performing processing of the operation step with each of the real data and the imaginary data being the input data series, adding the positive data and the negative data which are generated based on the real data to generate real operation data, and adding the positive data and the negative data which are generated based on the imaginary data to generate imaginary operation data;

a synthesis step of synthesizing the real operation data and the imaginary operation data to generate a baseband signal; and a transmission step of generating a transmission signal from the baseband signal.

It is preferable that the predetermined boundary value may be less than the maximum value of the elements of the input data series, and greater than the minimum value of the elements of the input data series.

It is preferable that the predetermined boundary value may be 0.

It is preferable that in the operation step, the same positive threshold value and the same negative threshold value may be used in cases where the input data series is the real data and where the input data series is the imaginary data.

According to a fourth aspect of the invention, there is provided a communication method that is executed by a communication apparatus communicating with another apparatus in orthogonal frequency-division multiplexing wireless communication, the communication apparatus method comprising:

a reception step of receiving a transmission signal and generating a baseband signal;

a serial-parallel conversion step of performing serial-parallel conversion on the baseband signal to generate a parallel signal;

a reception-side decomposition step of decomposing the parallel signal into real data which is a real part of the parallel signal, and imaginary data which is an imaginary part of the parallel signal;

an inverse operation step of generating positive data by subtracting from a predetermined positive threshold value a value of each element whose value is greater than 0 and by setting to 0 a value of each element whose value is equal to or less than 0 in elements of an input data series which is the real data or the imaginary data, and negative data by subtracting from a predetermined negative threshold value a value of each element whose value is equal to or less than 0 and by setting to 0 a value of each element whose value is greater than 0 in the elements of the input data series, or generating positive data by subtracting from the positive threshold value a value of each element whose value is equal to or greater than 0 and by setting to 0 a value of each element whose value is less than 0 in the elements of the input data series, and negative data by subtracting from the negative threshold value a value of each element whose value is less than 0 and by setting to 0 a value of each element whose value is equal to or greater than 0 in the elements of the input data series;

a reception-side generation step of performing processing of the inverse operation step with each of the real data and the imaginary data being the input data series, adding the positive data and the negative data which are generated based on the real data to generate real inverse operation data, and adding the positive data and the negative data which are generated based on the imaginary data to generate imaginary inverse operation data;

a reception-side synthesis step of synthesizing the real inverse operation data and the imaginary inverse operation data to generate second data;

a second transformation step of performing a fast Fourier transformation on the second data to generate a subcarrier modulation signal; and a demodulation step of demodulating the subcarrier modulation signal by a predetermined demodulation scheme.

According to the invention, it is possible to reduce the PAPR in OFDM communication, and further control the degree of reduction in PAPR.

BRIEF DESCRIPTION OF THE DRAWINGS

A more complete understanding of this application can be obtained when the following detailed description is considered in conjunction with the following drawings, in which:

FIG. 2 is a block diagram illustrating a different configuration example of the communication apparatus according to the embodiment;

FIG. 3A is a diagram illustrating examples of the operation of an operator according to the embodiment;

FIG. 3B is a diagram illustrating examples of the operation of an operator according to the embodiment;

DETAILED DESCRIPTION

Figure 1:
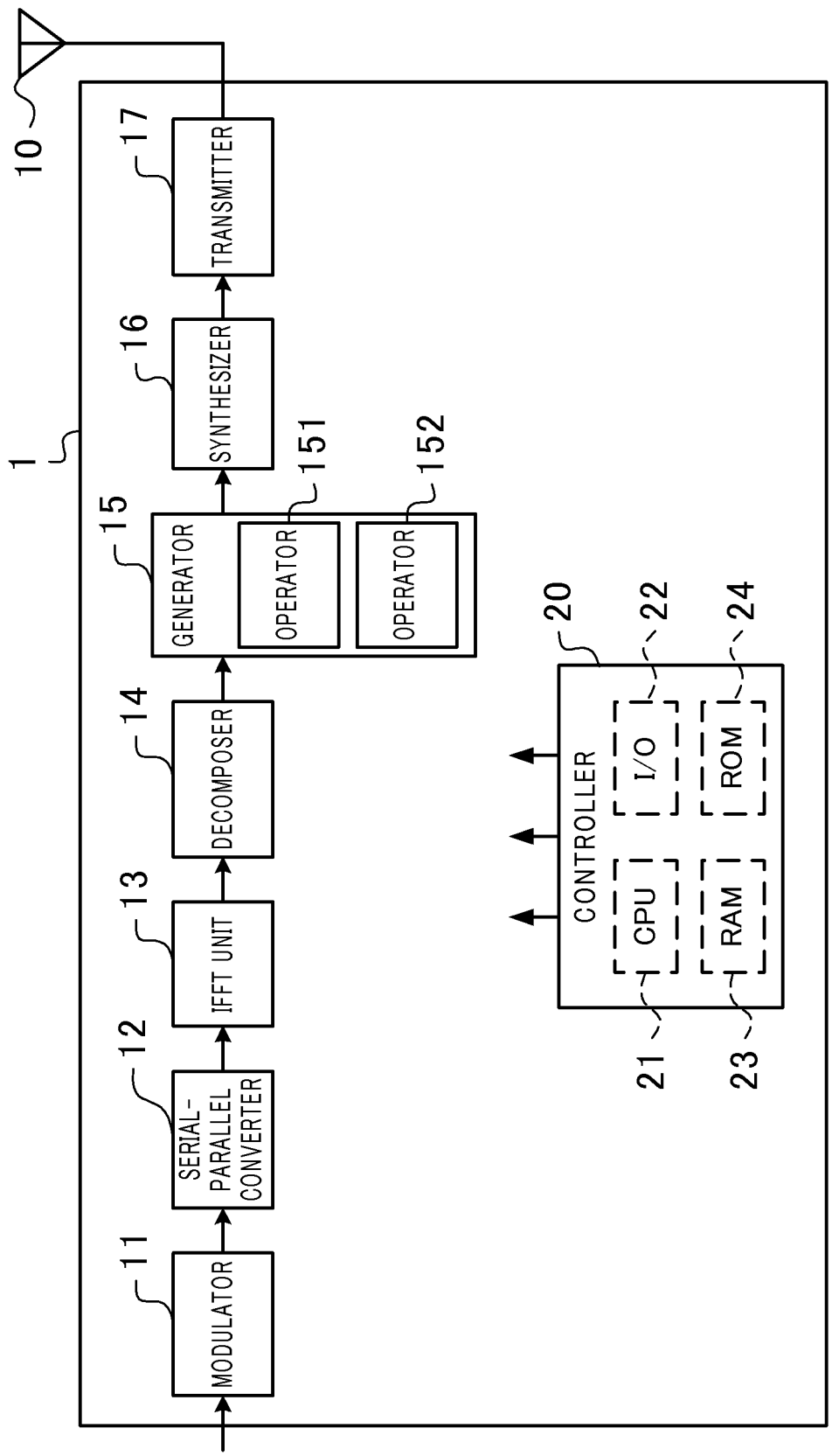
FIG. 1 is a block diagram illustrating a configuration example of a communication apparatus according to an exemplary embodiment of the invention.

An exemplary embodiment of the invention will be described in detail hereinbelow with reference to the accompanying drawings Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform an IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of a DFT hereinafter.

FIG. 1 is a block diagram illustrating a configuration example of a communication apparatus 1 according to an exemplary embodiment of the invention. The communication apparatus 1 communicates with another apparatus in OFDM (Orthogonal Frequency-Division Multiplexing) wireless communication. The communication apparatus 1 includes an antenna 10, a modulator 11, a serial-parallel converter 12, an IFFT unit 13, a decomposer 14, a generator 15, a synthesizer 16, a transmitter 17, and a controller 20. The generator 15 includes operators 151 and 152.

The controller 20 includes a CPU (Central Processing Unit) 21, RAM (Random Access Memory) 23, and ROM (Read-Only Memory) 24. Although signal lines from the controller 20 to the individual components are omitted to avoid complication and for the ease of understanding, the controller 20 is connected to the individual components of the communication apparatus 1 via an I/O (Input/Output) unit 22 to start and terminate the processes of the components and control the contents of the processes.

The RAM 23 stores data for generating a transmission frame, for example. The ROM 24 stores a control program for the controller 20 to control the operation of the communication apparatus 1. The controller 20 controls the communication apparatus 1 based on the control program.

FIG. 2 is a block diagram illustrating a different configuration example of the communication apparatus 1 according to the embodiment. To provide the communication apparatus 1 with a reception function, the communication apparatus 1 shown in FIG. 2 further includes a demodulator 31, a parallel-serial converter 32, an FFT unit 33, a synthesizer 34, a reception-side generator 35, a decomposer 36, a receiver 37, and a transmission/reception switch 38. The reception-side generator 35 includes inverse operators 351 and 352. Referring to the communication apparatus 1 shown in FIG. 2 which has the transmission function and the reception function, a communication method which is carried out by the communication apparatus 1 will be described hereinbelow.

The modulator 11 modulates an input signal by a predetermined modulation scheme to generate a modulation signal. The modulator 11 sends the generated modulation signal to the serial-parallel converter 12. The modulator 11 uses, for example, QPSK (Quadrature Phase-Shift Keying) as the modulation scheme. The serial-parallel converter 12 performs serial-parallel conversion on the modulation signal to generate a parallel signal, and assigns the generated parallel signal to subcarriers with frequency components orthogonal to each other to generate a subcarrier modulation signal. The serial-parallel converter 12 sends the generated subcarrier modulation signal to the IFFT unit 13. The IFFT unit 13 performs an IFFT on the subcarrier modulation signal to generate first data, and sends the generated first data to the decomposer 14.

The decomposer 14 decomposes the first data into real data which is a real part of the first data, and imaginary data which is an imaginary part of the first data, and sends the real data and the imaginary data to the generator 15. The generator 15 sends the real data to the operator 151, and sends the imaginary data to the operator 152. Because the operation of the operator 151 is the same as the operation of the operator 152, the operation of the operator 151 will be described below. Real data u received by the operator 151 is expressed by the following equation (1) where d represents the subcarrier modulation signal and $F^{-1}$ represents a matrix indicating an IFFT.

[Eq. 1]

$$u = Re(F^{-1} \cdot d) \quad (1)$$

The operator 151 generates positive data by subtracting from a predetermined positive threshold value a value of each element whose value is greater than a predetermined boundary value and by setting to 0 a value of each element whose value is equal to or less than the predetermined boundary value in elements of an input data series which is the real data. The operator 151 also generates negative data by subtracting from a predetermined negative threshold value a value of each element whose value is equal to or less than the predetermined boundary value and by setting to 0 a value of each element whose value is greater than the predetermined boundary value in the elements of the input data series.

Alternatively, the operator 151 generates positive data by subtracting from a predetermined positive threshold value a value of each element whose value is equal to or greater than a predetermined boundary value and by setting to 0 a value of each element whose value is less than the predetermined boundary value in elements of an input data series which is the real data. The operator 151 also generates negative data by subtracting from a predetermined negative threshold value a value of each element whose value is less than the predetermined boundary value and by setting to 0 a value of each element whose value is equal to or greater than the predetermined boundary value in the elements of the input data series.

The predetermined positive threshold value is a value greater than the maximum value of the elements in the input data series, and the predetermined negative threshold value is a value is equal to or less than the minimum value of the elements in the input data series. Alternatively, the predetermined positive threshold value is a value equal to or greater than the maximum value of the elements in the input data series, and the predetermined negative threshold value is a value less than the minimum value of the elements in the input data series. As will be discussed later, the predetermined positive threshold value and the predetermined negative threshold value are determined in consideration of the degree of reduction in PAPR (Peak-to-Average Power Ratio) and the degree of deterioration of the BER (Bit Error Rate). The absolute values of the predetermined positive threshold value and the predetermined negative threshold value may be the same, or may differ from each other.

The predetermined boundary value is an arbitrary real value determined beforehand. It is desirable that the predetermined boundary value should be less than the maximum value of the elements in an input data series and greater than the minimum value of the elements in the input data series. Further, with the predetermined boundary value being set to 0, it is possible to simplify the process of determining the size (larger/smaller) relationship between the value of each element and the predetermined boundary value.

The operator 151 performs the following operation using, for example, a positive threshold value greater than the maximum value of the elements in the input data series, a negative threshold value less than the minimum value of the elements in the input data series. The operator 151 extracts elements each having a value greater than 0 from the elements of the real data u, and generates data $u_+$ with the values of the elements other than these elements being set to 0, and extracts elements each having a value equal to or less than 0 from the elements of the real data u, and generates data $u_-$ with the values of the elements other than these elements being set to 0. The real data u is expressed by the following equation (2).

[Eq. 2]

$$u = u_+ + u_- \quad (2)$$

The operator 151 may be configured so as to extract elements each having a value equal to or greater than 0 in the elements in the real data u, and generate data $u_+$ with the values of the elements other than these elements being set to 0, and extract elements each having a value less than 0 in the elements in the real data u, and generate data $u_-$ with the values of the elements other than these elements being set to 0. Alternatively, in case where the positive threshold value is greater than the maximum value of the real data, the negative threshold value is less than the minimum value of the real data, and the predetermined boundary value is 0, the operator 151 may be configured so as to extract elements each having a value greater than 0 in the elements in the real data u, and generate data $u_+$ with the values of the elements other than these elements being set to 0, and extract elements each having a value less than 0 in the elements in the real data u, and generate data $u_-$ with the values of the elements other than these elements being set to 0.

Let $th_+$ be data the number of whose elements is the same as that of the elements in real data u in quantity, whose elements located at the same positions as those elements each having a value greater than 0 in the real data u has the predetermined positive threshold value, and whose elements other than these elements have values of 0. An equation (3) given below represents positive data $u'_+$ that is generated by the operator 151 by subtracting a value of an element from the predetermined positive threshold value for each element having a value greater than 0 in the elements in the real data u, and setting values of elements other than the element to 0.

[Eq. 3]

$$u'_+ = th_+ - u_+ \quad (3)$$

Let $th_-$ be data the number of whose elements is the same as that of the elements in real data u in quantity, whose elements located at the same positions as those elements each having a value equal to or less than 0 in the real data u has the predetermined negative threshold value, and whose elements other than these elements have values of 0. An equation (4) given below represents negative data $u'_-$ that is generated by the operator 151 by subtracting a value of an element from the predetermined negative threshold value for each element having a value equal to or less than 0 in the elements in the real data u, and setting values of elements other than the element to 0.

[Eq. 4]

$$u'_- = th_- - u_- \quad (4)$$

The generator 15 adds the positive data $u'_+$ and negative data $u'_-$, both generated by the operator 151 based on the real data u, to generate real operation data. The real operation data u' is expressed by the following equation (5).

[Eq. 5]

$$u' = u'_+ + u'_- \quad (5)$$

Further, the generator 15 adds the positive data and negative data, both generated by the operator 152 like the operator 151 based on the imaginary data, to generate imaginary operation data v'. The generator 15 sends the real operation data u' and the imaginary operation data v' to the synthesizer 16.

The predetermined positive threshold value and the predetermined negative threshold value used by the operator 151 may differ from the predetermined positive threshold value and the predetermined negative threshold value used by the operator 152. When the operators 151, 152 use the same predetermined positive threshold value and the same predetermined negative threshold value, the operators 151, 152 can be achieved by a single operator.

The synthesizer 16 synthesizes the real operation data u' and imaginary operation data v' sent thereto, and generates a baseband signal based on the synthesized data u'+jv', and sends the generated baseband signal to the transmitter 17 where j is an imaginary unit. The transmitter 17 generates a transmission signal from the baseband signal, and transmits the transmission signal to another apparatus via the transmission/reception switch 38 and the antenna 10.

The principle of reducing the PAPR through the foregoing operation is illustrated. FIGS. 3A and 3B are diagrams illustrating examples of operations performed in the generator according to the embodiment. FIGS. 3A and 3B each shows the values of elements in an input data series in graph with the abscissa representing the elements and the ordinate representing the amplitude. Let us consider only real data. FIG. 3A shows real data. The arrows in FIG. 3A each indicates a value obtained by subtracting the value of each element in the real data from the positive threshold value or the negative threshold value. FIG. 3B shows real operation data obtained by adding the positive data and the negative data, both generated by the operator 151 based on the real data. The arrows in FIG. 3B are the same as those in FIG. 3A, and the values indicated by the arrows are the values of the individual elements in the real operation data.

Figure 4A:
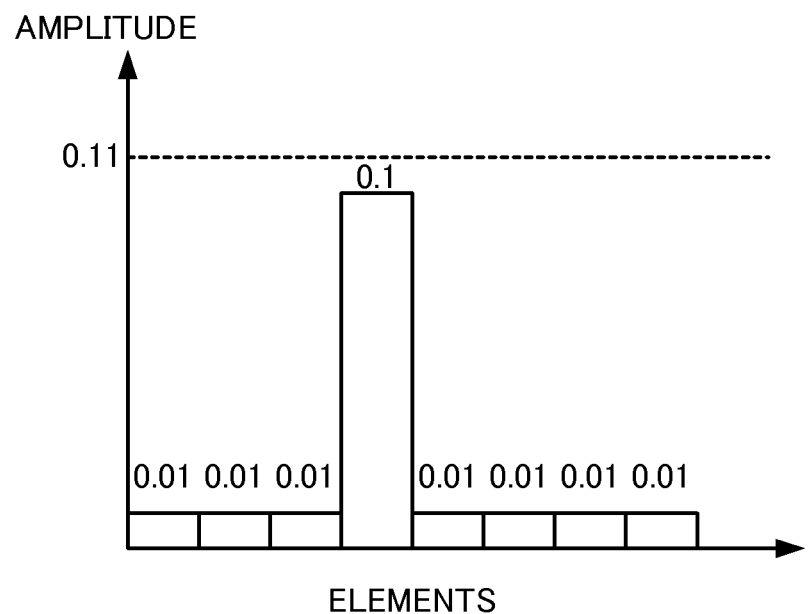
FIG. 4A is a diagram illustrating the principle of reducing a PAPR using the communication apparatus according to the embodiment.
Figure 4B:
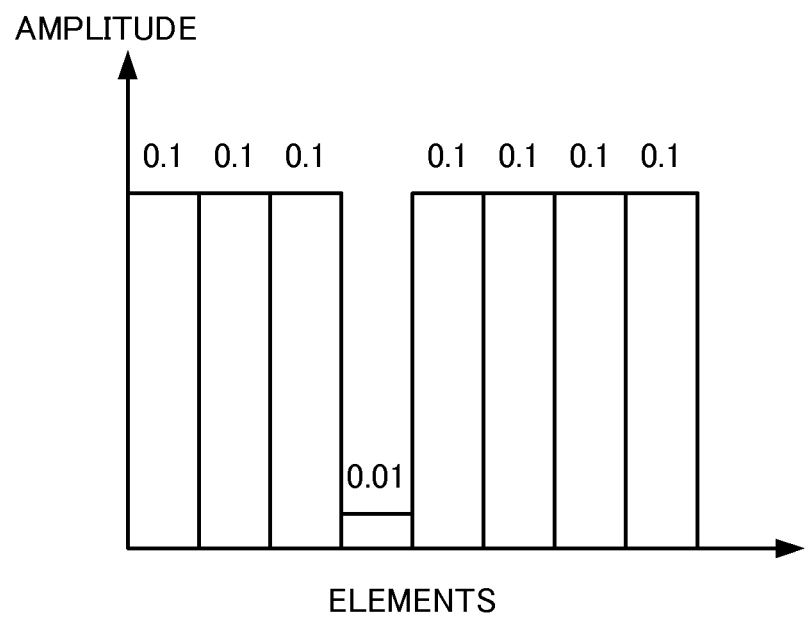
FIG. 4B is a diagram illustrating the principle of reducing a PAPR using the communication apparatus according to the embodiment.

FIGS. 4A and 4B are diagrams illustrating the principle of reducing the PAPR using the communication apparatus according to the embodiment. FIGS. 4A and 4B each shows the values of elements in an input data series in bar chart with the abscissa representing the elements and the ordinate representing the amplitude. Numerals on the bar chart represent the values of the individual elements. For the sake of simplicity, the value of every element is a positive real number. Further, the positive threshold value is 0.11, and the boundary value is 0. FIG. 4A shows real data, and FIG. 4B shows real operation data. The PAPR of the real data in FIG. 4A is 8.7371 dB as given by the following equation (6).

[Eq. 6]

$$10\log\left(\frac{0.01}{0.0013}\right) = 8.7371 \quad (6)$$

The PAPR of the real operation data in FIG. 4B is 0.5737 dB as given by the following equation (7).

[Eq. 7]

$$10\log\left(\frac{0.01}{0.0088}\right) = 0.5737 \quad (7)$$

It is therefore possible to reduce the PAPR of a baseband signal by generating the baseband signal based on a value obtained by subtracting the value of each element in real data and imaginary data from the positive threshold value or the negative threshold value.

Processing on the reception side will be described below. The receiver 37 receives the transmission signal via the antenna 10 and the transmission/reception switch 38, and generates a baseband signal. The receiver 37 sends the generated baseband signal to the decomposer 36. The decomposer 36 performs serial-parallel conversion on the baseband signal to generate a parallel signal. The decomposer 36 decomposes the parallel signal into real data which is a real part of the parallel signal, and imaginary data which is an imaginary part of the parallel signal, and sends the real data and the imaginary data to the reception-side generator 35. The reception-side generator 35 sends the real data to the inverse operator 351, and the imaginary data to the inverse operator 352. Because the operation of the inverse operator 351 is the same as the operation of the inverse operator 352, the operation of the inverse operator 351 will be described below. Real data received by the inverse operator 351 is represented by "r".

The inverse operator 351 generates positive data by subtracting from a predetermined positive threshold value a value of each element whose value is greater than 0 and by setting to 0 a value of each element whose value is equal to or less than 0 in elements of an input data series which is the real data or the imaginary data. The inverse operator 351 also generates negative data by subtracting from a predetermined negative threshold value a value of each element whose value is equal to or less than 0 and by setting to 0 a value of each element whose value is greater than 0 in the elements of the input data series.

Alternatively, the inverse operator 351 generates positive data by subtracting from a predetermined positive threshold value a value of each element whose value is equal to or greater than 0 and by setting to 0 a value of each element whose value is less than 0 in the elements of the input data series. The inverse operator 351 also generates negative data by subtracting from a predetermined negative threshold value a value of each element whose value is less than 0 and by setting to 0 a value of each element whose value is equal to or greater than 0 in the elements of the input data series.

The predetermined positive threshold value and the predetermined negative threshold value which are used by the inverse operator 351 are respectively identical to the predetermined positive threshold value and the predetermined negative threshold value both used by the transmission-side operator 151. When the positive threshold value is greater than the maximum value of the elements in the input data series, the inverse operator 351 generates positive data by subtracting a value of each element whose value is greater than 0 from the predetermined positive threshold value and by setting values of the other elements in the elements in the input data series. When the positive threshold value is equal to or greater than the maximum value of the elements in the input data series, on the other hand, the inverse operator 351 generates positive data by subtracting a value of each element whose value is equal to or greater than 0 from the predetermined positive threshold value and by setting values of the other elements in the elements in the input data series.

Likewise, when the negative threshold value is equal to or less than the minimum value of the elements in the input data series to the transmission-side operator 151, the inverse operator 351 generates negative data by subtracting a value of each element whose value is equal to or less than 0 from the negative threshold value and by setting values of the other elements in the elements in the input data series. When the negative threshold value is less than the maximum value of the elements in the input data series to the transmission-side operator 151, the inverse operator 351 generates negative data by subtracting a value of each element whose value is less than 0 from the negative threshold value and by setting values of the other elements in the elements in the input data series.

Because the positive threshold value used by the transmission-side operator 151 is greater than the maximum value of the elements in the real data u in the above example, the inverse operator 351 extracts elements each having a value greater than 0 from the elements of the real data r', and generates data $r'_+$, treating values of the elements other than these elements as 0. Likewise, because the negative threshold value used by the transmission-side operator 151 is less than the minimum value of the elements in the real data u in the above example, the inverse operator 351 extracts elements each having a value less than 0 from the elements of the real data r', and generates data r'_, treating values of the elements other than these elements as 0. The real data r' is expressed by the following equation (8).

[Eq. 8]

$$r' = r'_+ + r'_-  \quad (8)$$

Using data th$_+$, the inverse operator 351 generates positive data r$_+$ by subtracting a value of an element from the predetermined positive threshold value for each element having a value greater than 0 in the elements in the real data r', and setting values of the elements other than the element to 0. The data th$_+$ used on the reception side is data whose elements are identical in number to the elements in the real data r', whose elements located at the same positions as those elements each having a value greater than 0 in the real data r' has the predetermined positive threshold value, and whose elements other than these elements have values of 0. Therefore, the data th$_+$ used on the reception side is identical to the data th$_+$ used on the transmission side. The generated positive data r$_+$ is expressed by the following equation (9).

[Eq. 9]

$$r_+ = th_+ - r'_+  \quad (9)$$

Likewise, using data th_, the inverse operator 351 generates negative data r_ by subtracting a value of an element from the predetermined negative threshold value for each element having a value less than 0 in the elements in the real data r', and setting values of the elements other than the element to 0. The data th_ used on the reception side is data whose elements are identical in number to the elements in the real data r', whose elements located at the same positions as those elements each having a value less than 0 in the real data r' has the predetermined negative threshold value, and whose elements other than these elements have values of 0. Therefore, the data th_ used on the reception side is identical to the data th_ used on the transmission side. The generated negative data r_ is expressed by the following equation (10).

[Eq. 10]

$$r_- = th_- - r'_-  \quad (10)$$

The reception-side generator 35 adds the positive data r$_+$ and the negative data r_ both generated by the inverse operator 351 based on the real data r' to generate real inverse operation data r. The real inverse operation data r is expressed by the following equation (11).

[Eq. 11]

$$r = r_+ + r_-  \quad (11)$$

Substituting the equations (9) and (10) into the equation (11) yields the following equation (12a). Because the real data r' is identical to the real operation data u' generated by the generator 15, r'$_+$=u'$_+$ and r'_=u'_ are satisfied. Further, substituting both satisfied equations and the equations (3) and (4) into the equation (12a) yields the following equation (12b). Thus, the real inverse operation data r is identical to the real data u generated by the decomposer 14.

[Eq. 12]

$$r = th_+ - r'_+ + th_- - r'_-  \quad (12a)$$

$$= u_+ + u_- = u  \quad (12b)$$

Further, the reception-side generator 35 adds the positive data and the negative data both generated by the inverse operator 352, like the inverse operator 351, based on the imaginary data to generate imaginary inverse operation data s. The reception-side generator 35 sends the real inverse operation data r and the imaginary inverse operation data s to the synthesizer 34.

The predetermined positive threshold value and the predetermined negative threshold value which are used by the inverse operator 352, like those used by the inverse operator 351, are respectively identical to the predetermined positive threshold value and the predetermined negative threshold value both used by the transmission-side operator 152. The predetermined positive threshold value and the predetermined negative threshold value which are used by the inverse operator 351 may differ from the predetermined positive threshold value and the predetermined negative threshold value which are used by the inverse operator 352 as in the case of the transmission-side operators. When the inverse operators 351, 352 use the same predetermined positive threshold value and the same predetermined negative threshold value, the inverse operators 351, 352 can be achieved by a single operator.

The synthesizer 34 adds the real inverse operation data r and the imaginary inverse operation data s sent thereto to generate second data represented by r+js, and sends the generated second data to the FFT unit 33. The FFT unit 33 performs an FFT on the second data to generate a subcarrier modulation signal. The FFT unit 33 sends the generated subcarrier modulation signal to the parallel-serial converter 32.

The parallel-serial converter 32 performs parallel-serial conversion on the subcarrier modulation signal to generate a serial signal, and sends the generated serial signal to the demodulator 31. The demodulator 31 demodulates the serial signal by a predetermined demodulation scheme. For example, the demodulator 31 performs QPSK demodulation on the serial signal. Accordingly, the demodulator 31 can demodulate the input signal modulated by the modulator 11, and output the modulated signal.

The communication apparatus 1 carries out communication, for example, in the following manner according to the foregoing principle. Assume that real data u generated by the decomposer 14 is expressed by the following equation (13) when the number of subcarriers is 4.

[Eq. 13]

$$u = \begin{bmatrix} 5 \\ -1 \\ 2 \\ 1 \end{bmatrix} \quad (13)$$

Given that the positive threshold value is 6, the negative threshold value is −6, and the boundary value is 0 as one example, u$_+$ and u_ are expressed by the following equation (14).

[Eq. 14]

$$u_+ = \begin{bmatrix} 5 \\ 0 \\ 2 \\ 1 \end{bmatrix} \quad (14)$$

$$u_- = \begin{bmatrix} 0 \\ -1 \\ 0 \\ 0 \end{bmatrix}$$

The positive data u'$_+$ that is generated by the operator 151 based on the real data u is expressed by the following equation (15).

[Eq. 15]

$$u'_+ = \begin{bmatrix} 6 \\ 0 \\ 6 \\ 6 \end{bmatrix} - \begin{bmatrix} 5 \\ 0 \\ 2 \\ 1 \end{bmatrix} = \begin{bmatrix} 1 \\ 0 \\ 4 \\ 5 \end{bmatrix} \quad (15)$$

The negative data u'$_-$ that is generated by the operator 151 based on the real data u is expressed by the following equation (16).

[Eq. 16]

$$u'_- = \begin{bmatrix} 0 \\ -6 \\ 0 \\ 0 \end{bmatrix} - \begin{bmatrix} 0 \\ -1 \\ 0 \\ 0 \end{bmatrix} = \begin{bmatrix} 0 \\ -5 \\ 0 \\ 0 \end{bmatrix} \quad (16)$$

The real operation data u' that the generator 15 generates by adding the positive data u'$_+$ and the negative data u'$_-$, both generated by the operator 151 based on the real data u, is expressed by the following equation (17).

[Eq. 17]

$$u' = \begin{bmatrix} 1 \\ 0 \\ 4 \\ 5 \end{bmatrix} + \begin{bmatrix} 0 \\ -5 \\ 0 \\ 0 \end{bmatrix} = \begin{bmatrix} 1 \\ -5 \\ 4 \\ 5 \end{bmatrix} \quad (17)$$

Further, the generator 15 adds the positive data and the negative data both generated by the operator 152, like the operator 151, based on the imaginary data to generate imaginary operation data. The generator 15 sends the real operation data and the imaginary operation data to the synthesizer 16. The synthesizer 16 synthesizes the real operation data and the imaginary operation data to generate a baseband signal, and sends the generated baseband signal to the transmitter 17. The transmitter 17 generates a transmission signal from the baseband signal, and transmits the transmission signal to another apparatus via the transmission/reception switch 38 and the antenna 10.

Processing on the reception side will be described below. The receiver 37 receives the transmission signal via the antenna 10 and the transmission/reception switch 38, and generates a baseband signal. The receiver 37 sends the generated baseband signal to the decomposer 36. The decomposer 36 performs serial-parallel conversion on the baseband signal to generate a parallel signal. The decomposer 36 decomposes the parallel signal into real data and imaginary data, and sends the real data and the imaginary data to the reception-side generator 35. The reception-side generator 35 sends the real data to the inverse operator 351, and the imaginary data to the inverse operator 352. Because the operation of the inverse operator 351 is the same as the operation of the inverse operator 352, the operation of the inverse operator 351 will be described below. Real data r' received by the inverse operator 351 is represented by the following equation (18).

[Eq. 18]

$$r' = \begin{bmatrix} 1 \\ -5 \\ 4 \\ 5 \end{bmatrix} \quad (18)$$

Data r'$_+$ and r'$_-$ are expressed by the following equation (19).

[Eq. 19]

$$r'_+ = \begin{bmatrix} 1 \\ 0 \\ 4 \\ 5 \end{bmatrix} \quad (19)$$

$$r'_- = \begin{bmatrix} 0 \\ -5 \\ 0 \\ 0 \end{bmatrix}$$

The positive data r$_+$ generated by the inverse operator 351 based on the real data r' is expressed by the following equation (20), and is identical to u$_+$ given by the equation (14).

[Eq. 20]

$$r_+ = \begin{bmatrix} 6 \\ 0 \\ 6 \\ 6 \end{bmatrix} - \begin{bmatrix} 1 \\ 0 \\ 4 \\ 5 \end{bmatrix} = \begin{bmatrix} 5 \\ 0 \\ 2 \\ 1 \end{bmatrix} \quad (20)$$

The negative data r$_-$ generated by the inverse operator 351 based on the real data r' is expressed by the following equation (21), and is identical to u$_-$ given by the equation (14).

[Eq. 21]

$$r_- = \begin{bmatrix} 0 \\ -6 \\ 0 \\ 0 \end{bmatrix} - \begin{bmatrix} 0 \\ -5 \\ 0 \\ 0 \end{bmatrix} = \begin{bmatrix} 0 \\ -1 \\ 0 \\ 0 \end{bmatrix} \quad (21)$$

The real inverse operation data r that the reception-side generator 35 generates by adding the positive data r$_+$ and the negative data r$_-$, both generated by the inverse operator 351 based on the real data r', is expressed by the following equation (22). The real inverse operation data r is identical to the real data u given by the equation (13).

[Eq. 22]

$$r = \begin{bmatrix} 5 \\ 0 \\ 2 \\ 1 \end{bmatrix} + \begin{bmatrix} 0 \\ -1 \\ 0 \\ 0 \end{bmatrix} = \begin{bmatrix} 5 \\ -1 \\ 2 \\ 1 \end{bmatrix} \quad (22)$$

Further, the reception-side generator 35 adds the positive data and the negative data both generated by the inverse operator 352, like the inverse operator 351, based on the imaginary data to generate imaginary inverse operation data. The reception-side generator 35 sends the real inverse operation data and the imaginary inverse operation data to the synthesizer 34. The synthesizer 34 adds the real inverse operation data and the imaginary inverse operation data sent thereto to generate second data, and sends the generated second data to the FFT unit 33. The FFT unit 33 performs an FFT on the second data to generate a subcarrier modulation signal, and sends the generated subcarrier modulation signal to the parallel-serial converter 32. The parallel-serial converter 32 performs parallel-serial conversion on the subcarrier modulation signal to generate a serial signal, and sends the generated serial signal to the demodulator 31. The demodulator 31 demodulates the serial signal by a predetermined demodulation scheme. For example, the demodulator 31 performs QPSK demodulation on the serial signal. Accordingly, the demodulator 31 can demodulate the input signal modulated by the modulator 11, and output the modulated signal.

As described above, the communication apparatus 1 according to the embodiment of the invention can reduce the PAPR in OFDM communication by generating a baseband signal based on data generated by subtracting the value of each element in first data, generated through an IFFT performed on a subcarrier modulation signal, from a predetermined positive threshold value or a predetermined negative threshold value. As will be discussed later, the communication apparatus 1 can reduce the PAPR and control the degree of reduction in PAPR.

Specific Examples

Next, the advantages of the embodiment of the invention will be described based on the results of simulation. Generation of a baseband signal and repeating calculation of the PAPR 10,000 times according to the related art and the embodiment were simulated. The PAPR characteristics according to the related art were compared with the PAPR characteristics according to the embodiment with QPSK used as the modulation scheme and the FFT size being 2048. The related art concerns a method of generating a baseband signal from a subcarrier modulation signal without performing the foregoing operations. The simulation was conducted on the embodiment with different absolute values of the threshold value of 0.03, 0.06 and 0.09.

The average value of the simulated PAPRs was 9.1 dB according to the related art, whereas, according to the embodiment, the average PAPR was 3.6 dB when the absolute value of the threshold value was 0.03, the average PAPR was 1.8 dB when the absolute value of the threshold value was 0.06, and the average PAPR was 1.2 dB when the absolute value of the threshold value was 0.09. It is apparent that the use of the communication apparatus according to the embodiment can reduce the PAPR. It is also apparent that increasing the absolute value of the threshold value makes the PAPR lower.

Figure 5:
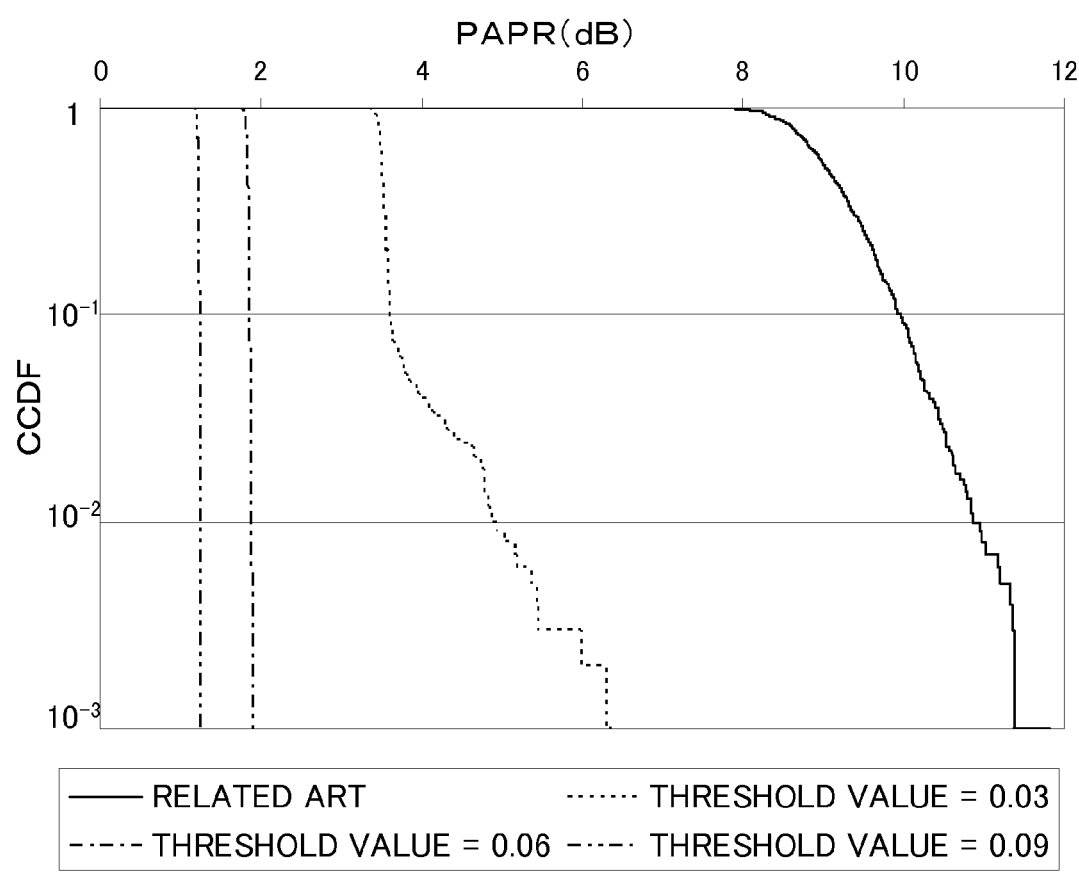
FIG. 5 is a diagram illustrating simulated CCDF characteristics of the PAPRs of baseband signals.

In addition, the CCDF (Complementary Cumulative Distribution Function) of the PAPR, i.e., the characteristic of the probability of occurrence of the PAPR, according to the related art was compared with the CCDF of the PAPR according to the embodiment. FIG. 5 is a diagram illustrating simulated CCDF characteristics of the PAPRs of baseband signals. The abscissa represents the PAPR (unit: dB), and the ordinate represents the CCDF of the PAPR. A solid-line graph represents the CCDF characteristic of the PAPR according to the related art. A dotted-line graph represents the CCDF characteristic of the PAPR according to the embodiment with the absolute value of the threshold value being set to 0.03. A dashed-line graph represents the CCDF characteristic of the PAPR according to the embodiment with the absolute value of the threshold value being set to 0.06. A two-dot chain line represents the CCDF characteristic of the PAPR according to the embodiment with the absolute value of the threshold value being set to 0.09. Within the illustrated range, the PAPR according to the embodiment of the invention was reduced as compared with the PAPR according to the related art, and increasing the absolute value of the threshold value made the PAPR lower according to the embodiment.

Figure 6:
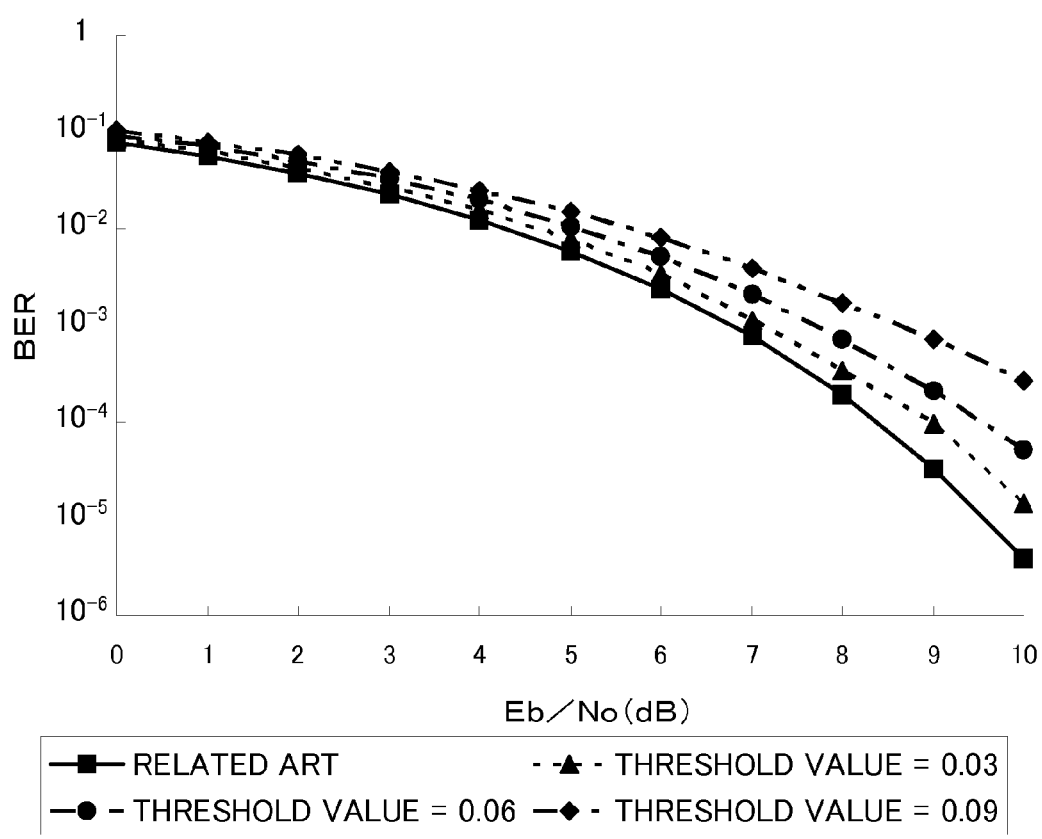
FIG. 6 is a diagram showing simulated BER characteristics.

Next, simulation on the BER was performed. FIG. 6 is a diagram showing simulated BER characteristics. The abscissa represents the Eb/No (Energy per Bit to NOise power spectral density ratio), and the ordinate represents the BER. The unit of Eb/N is dB. A solid-line graph showing the plot points by squares represents the BER according to the related art. A dotted-line graph showing the plot points by triangles represents the BER according to the embodiment with the absolute value of the threshold value being set to 0.03. A dashed-line graph showing the plot points by round dots represents the BER according to the embodiment with the absolute value of the threshold value being set to 0.06. A graph given by a two-dot chain line showing the plot points by rhomboids represents the BER according to the embodiment with the absolute value of the threshold value being set to 0.09. According to the embodiment, the BER was deteriorated with an increase in the absolute value of the threshold value as compared to that in the related art.

This is because increasing the absolute value of the threshold value causes a small value to be hidden in noise. However, the BER can be improved by increasing the transmission power.

It is apparent from the results of the simulation that the embodiment of the invention can reduce the PAPR in OFDM communication by generating a baseband signal based on data generated by subtracting the value of each element in first data, generated through an IFFT performed on a subcarrier modulation signal, from a predetermined positive threshold value or a predetermined negative threshold value, and can control the degree of reduction in PAPR by changing the absolute value of the threshold value.

The modes of the invention are not limited to the foregoing embodiments. The modulation scheme of the modulator 11 is not limited to QPSK, but PSK (Phase Shift Keying), QAM (Quadrature Amplitude Modulation) or the like may be used instead of QPSK. The layout order of the modulator 11 and the serial-parallel converter 12 may be changed so that the serial-parallel converter 12 performs serial-parallel conversion on an input signal and assigns individual pieces of data in the parallel signal to subcarrier signals, and then the modulator 11 modulates the individual pieces of data in the parallel signal by a predetermined modulation scheme. In this case, the demodulation process is carried out on the reception side with the layout order of the demodulator 31 and the parallel-serial converter 32 being changed.

The IFFT unit 13 may be configured so as to perform an IDFT instead of an IFFT, and the FFT unit 33 may be configured so as to perform a DFT instead of an FFT.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus for communicating with another apparatus in orthogonal frequency-division multiplexing wireless communication, the communication apparatus comprising:
a modulator for modulating an input signal using a predetermined modulation scheme, and assigns the modulated input signal to subcarriers with frequency components orthogonal to each other, thereby generating a subcarrier modulation signal;
a controller configured to start processes of:
performing an inverse fast Fourier transformation on the subcarrier modulation signal to generate first data;
decomposing the first data into real data which is a real part of the first data, and imaginary data which is an imaginary part of the first data;
using a predetermined positive threshold value greater than a maximum value of elements in an input data series which is the real data or the imaginary data, and a predetermined negative threshold value equal to or less than a minimum value of the elements in the input data series, or
using a predetermined positive threshold value equal to or greater than the maximum value of the elements in the input data series, and a predetermined negative threshold value less than the minimum value of the elements in the input data series,
generating positive data having a positive element whose value is less as a value of the element in the input data series is greater by subtracting from the positive threshold value a value of each element whose value is greater than a predetermined boundary value and by setting to 0 a value of each element whose value is equal to or less than the predetermined boundary value in the elements of the input data series, and negative data having a negative element whose value is less as a value of the element in the input data series is greater by subtracting from the negative threshold value a value of each element whose value is equal to or less than the predetermined boundary value and by setting to 0 a value of each element whose value is greater than the predetermined boundary value in the elements of the input data series, or
generating positive data having a positive element whose value is less as a value of the element in the input data series is greater by subtracting from the positive threshold value a value of each element whose value is equal to or greater than the predetermined boundary value and by setting to 0 a value of each element whose value is less than the predetermined boundary value in the elements of the input data series, and negative data having a negative element shows value is less as a value of the element in the input data series is greater by subtracting from the negative threshold value a value of each element whose value is less than the predetermined boundary value and by setting to 0 a value of each element whose value is equal to or greater than the predetermined boundary value in the elements of the input data series;
processing each of the real data and the imaginary data being the input data series, adding the positive data and the negative data which are generated based on the real data to generate real operation data, and adding the positive data and the negative data which are generated based on the imaginary data to generate imaginary operation data;
synthesizing the real operation data and the imaginary operation data to generate a baseband signal; and
a transmitter for generating a transmission signal from the baseband signal.

2. The communication apparatus according to claim 1, wherein the predetermined boundary value is less than the maximum value of the elements of the input data series, and greater than the minimum value of the elements of the input data series.

3. The communication apparatus according to claim 2, wherein the predetermined boundary value is 0.

4. The communication apparatus according to claim 1, wherein the same positive threshold value and the same negative threshold value are used in cases where the input data series is the real data and where the input data series is the imaginary data.

5. A communication apparatus for communicating with another apparatus in orthogonal frequency-division multiplexing wireless communication, the communication apparatus comprising:
a receiver for receiving a transmission signal and generates a baseband signal;
a controller configured to start processes of:
performing serial-parallel conversion on the baseband signal to generate a parallel signal;
decomposing on a reception-side the parallel signal into real data which is a real part of the parallel signal, and imaginary data which is an imaginary part of the parallel signal;
using a predetermined positive threshold value greater than a maximum value of elements in an input data series which is the real data or the imaginary data, and a predetermined negative threshold value equal to or less than a minimum value of the elements in the input data series, or
using a predetermined positive threshold value equal to or greater than the maximum value of the elements in the input data series, and a predetermined negative threshold value less than the minimum value of the elements in the input data series,
generating positive data having a positive element whose value is less as a value of the element in the input data series is greater by subtracting from the positive threshold value a value of each element whose value is greater than 0 and by setting to 0 a value of each element whose value is equal to or less than 0 in elements of the input data series, and negative data having a negative element whose value is less as a value of the element in the input data series is greater by subtracting from the negative threshold value a value of each element whose value is equal to or less than 0 and by setting to 0 a value of each element whose value is greater than 0 in the elements of the input data series, or
generating positive data having a positive element whose value is less as a value of the element in the input data series is greater by subtracting from the positive threshold value a value of each element whose value is equal to or greater than 0 and by setting to 0 a value of each element whose value is less than 0 in the elements of the input data series, and negative data having a negative element whose value is less as a value of the element in the input data series is greater by subtracting from the negative threshold value a value of each element whose value is less than 0 and by setting to 0 a value of each element whose value is equal to or greater than 0 in the elements of the input data series;

performing on the reception-side processing of each of the real data and the imaginary data being the input data series, adding the positive data and the negative data which are generated based on the real data to generate real inverse operation data, and adding the positive data and the negative data which are generated based on the imaginary data to generate imaginary inverse operation data;

synthesizing on the reception-side the real inverse operation data and the imaginary inverse operation data to generate second data;

performing on the reception-side a fast Fourier transformation on the second data to generate a subcarrier modulation signal; and a demodulator for demodulating the subcarrier modulation signal by a predetermined demodulation scheme.

6. A communication method that is executed by a communication apparatus communicating with another apparatus in orthogonal frequency-division multiplexing wireless communication, the communication method comprising:

a modulation step of modulating an input signal using a predetermined modulation scheme, and assigning the modulated input signal to subcarriers with frequency components orthogonal to each other, thereby generating a subcarrier modulation signal;

a first transformation step of performing an inverse fast Fourier transformation on the subcarrier modulation signal to generate first data;

a decomposition step of decomposing the first data into real data which is a real part of the first data, and imaginary data which is an imaginary part of the first data;

an operation step of, using a predetermined positive threshold value greater than a maximum value of elements in an input data series which is the real data or the imaginary data, and a predetermined negative threshold value equal to or less than a minimum value of the elements in the input data series, or using a predetermined positive threshold value equal to or greater than the maximum value of the elements in the input data series, and a predetermined negative threshold value less than the minimum value of the elements in the input data series, generating positive data having a positive element whose value is less as a value of the element in the input data series is greater by subtracting from the positive threshold value a value of each element whose value is greater than a predetermined boundary value and by setting to 0 a value of each element whose value is equal to or less than the predetermined boundary value in the elements of the input data series, and negative data having a negative element shows value is less as a value of the element in the input data series is greater by subtracting from the negative threshold value a value of each element whose value is equal to or less than the predetermined boundary value and by setting to 0 a value of each element whose value is greater than the predetermined boundary value in the elements of the input data series, or generating positive data by subtracting from the positive threshold value a value of each element whose value is equal to or greater than the predetermined boundary value and by setting to 0 a value of each element whose value is less than the predetermined boundary value in the elements of the input data series, and negative data by subtracting from the negative threshold value a value of each element whose value is less than the predetermined boundary value and by setting to 0 a value of each element whose value is equal to or greater than the predetermined boundary value in the elements of the input data series;

a generation step of performing processing of the operation step with each of the real data and the imaginary data being the input data series, adding the positive data and the negative data which are generated based on the real data to generate real operation data, and adding the positive data and the negative data which are generated based on the imaginary data to generate imaginary operation data;

a synthesis step of synthesizing the real operation data and the imaginary operation data to generate a baseband signal; and a transmission step of generating a transmission signal from the baseband signal.

7. The communication method according to claim 6, wherein the predetermined boundary value is less than the maximum value of the elements of the input data series, and greater than the minimum value of the elements of the input data series.

8. The communication method according to claim 7, wherein the predetermined boundary value is 0.

9. The communication method according to claim 6, wherein in the operation step, the same positive threshold value and the same negative threshold value are used in cases where the input data series is the real data and where the input data series is the imaginary data.

10. A communication method that is executed by a communication apparatus communicating with another apparatus in orthogonal frequency-division multiplexing wireless communication, the communication method comprising:

a reception step of receiving a transmission signal and generating a baseband signal;

a serial-parallel conversion step of performing serial-parallel conversion on the baseband signal to generate a parallel signal;

a reception-side decomposition step of decomposing the parallel signal into real data which is a real part of the parallel signal, and imaginary data which is an imaginary part of the parallel signal;

an inverse operation step using a predetermined positive threshold value greater than a maximum value of elements in an input data series which is the real data or the imaginary data, and a predetermined negative threshold value equal to or less than a minimum value of the elements in the input data series, or using a predetermined positive threshold value equal to or greater than the maximum value of the elements in the input data series, and a predetermined negative threshold value less than the minimum value of the elements in the input data series, of generating positive data having a positive element whose value is less as a value of the element in the input data series is greater by subtracting from the positive threshold value a value of each element whose value is greater than 0 and by setting to 0 a value of each element whose value is equal to or less than 0 in elements of the input data series, and negative data having a negative element whose value is less as a value of the element in the input data series is greater by subtracting from the negative threshold value a value of each element whose value is equal to or less than 0 and by setting to 0 a value of each element whose value is greater than 0 in the elements of the input data series, or generating positive data having a positive element whose value is less as a value of the element in the input data series is greater by subtracting from the positive threshold value a value of each element whose value is equal to or greater than 0 and by setting to 0 a value of each element whose value is less than 0 in the elements of the input data series, and negative data having a negative element whose value is less as a value of the element in the input data series is greater by subtracting from the negative threshold value a value of each element whose value is less than 0 and by setting to 0 a value of each element whose value is equal to or greater than 0 in the elements of the input data series;

a reception-side generation step of performing processing of the inverse operation step with each of the real data and the imaginary data being the input data series, adding the positive data and the negative data which are generated based on the real data to generate real inverse operation data, and adding the positive data and the negative data which are generated based on the imaginary data to generate imaginary inverse operation data;

a reception-side synthesis step of synthesizing the real inverse operation data and the imaginary inverse operation data to generate second data;

a second transformation step of performing a fast Fourier transformation on the second data to generate a subcarrier modulation signal; and a demodulation step of demodulating the subcarrier modulation signal by a predetermined demodulation scheme.

\* \* \* \* \*